United States Patent
Samuelson et al.

(10) Patent No.: US 6,443,180 B1
(45) Date of Patent: Sep. 3, 2002

(54) HYDRAULIC LINE ADJUSTABLE VELOCITY FUSE WITH DAMPING

(75) Inventors: Duane Samuelson; Gordon Yowell, both of Boca Raton; Stephen Kaylor, Pompano Beach, all of FL (US)

(73) Assignee: Predator Systems Inc., Boca Raton, FL (US)

( * ) Notice: Subject to any disclaimer, the term of this patent is extended or adjusted under 35 U.S.C. 154(b) by 0 days.

(21) Appl. No.: 09/808,077

(22) Filed: Mar. 15, 2001

(51) Int. Cl.[7] .............................................. F16K 17/30
(52) U.S. Cl. ........................ 137/460; 137/462; 137/498
(58) Field of Search ................................ 137/460, 459, 137/498, 462

(56) References Cited

U.S. PATENT DOCUMENTS

| | | | |
|---|---|---|---|
| 3,476,141 A | * 11/1969 | Tillman | ....................... 137/498 |
| 4,383,549 A | 5/1983 | Maldavs | |
| 4,574,833 A | 3/1986 | Custer | |
| 4,605,039 A | * 8/1986 | Johnson et al. | ......... 137/498 X |
| 4,699,166 A | * 10/1987 | Gold et al. | ............. 137/498 X |
| 4,736,889 A | 4/1988 | Stephenson | |
| 5,507,466 A | 4/1996 | Yowell | |
| 6,019,115 A | 2/2000 | Sanders | |

* cited by examiner

Primary Examiner—Kevin Lee
(74) Attorney, Agent, or Firm—Alvin S. Blum

(57) ABSTRACT

A velocity fuse for a hydraulic line shuts off fluid flow when the flow rate exceeds a preset flow value. The shut off value may be adjusted while the fuse is mounted in the hydraulic circuit. A damping mechanism of the dash pot type prevents the fuse from responding to flow surges of short duration. A poppet or piston within a tubular housing reciprocates between an open position held by a spring and a closed position when flow through an adjustable aperture causes a great enough pressure drop to overcome the spring bias. The damping mechanism is unaffected by the flow rate setting.

5 Claims, 2 Drawing Sheets

HYDRAULIC LINE ADJUSTABLE VELOCITY FUSE WITH DAMPING

BACKGROUND OF THE INVENTION

This invention relates to apparatus for closing off the flow of hydraulic fluid when flow rate exceeds a pre-set value, and more particularly to such a velocity fuse in which the pre-set value can be adjusted while the fuse is in the hydraulic line, and the apparatus is not triggered by high flow rates of very short duration.

In many hydraulic systems a line rupture causes a greatly increased flow rate, as fluid is lost. The loss of fluid may adversely affect function that can be saved if flow is promptly cut off. For this purpose, it is well known to employ excess flow protectors called velocity fuses. U.S. Pat. No. 4,383,549 issued May 17, 1983 to Maldavs discloses a poppet valve device of this type in which the flow rate required to actuate shut off is adjustable while the device is connected in the circuit. This is convenient in that the set point may need to be adjusted as the fluid heats up and viscosity is reduced. As it points out, such devices in the past have had the problem of being actuated by brief surges of flow, such as at start up. Its solution to this problem is to make the device with a dash pot chamber to prevent premature closing of the poppet valve from high flow surges of short duration. It has two fluid-filled chambers 31 and 32 that communicate through an annular constriction. As the poppet moves to close the valve, fluid must move from chamber 31 through the constriction to chamber 32. This takes time. If the surge has stopped before the valve closes, the spring returns the poppet to full open. The adjustment of the flow rate set point is achieved by moving the poppet closer to its closing off seat by an external set screw. Although this is convenient, the structure is very complex to manufacture. An additional problem is encountered with this structure. The damping function is affected by this flow rate adjustment. As the poppet is moved closer to its seat for lowering the set point, fluid is moved into chamber 32 from chamber 31. Now there is less time required to fill chamber 32. Consequently, the device is now protective of only shorter duration surges.

SUMMARY OF THE INVENTION

It is accordingly an object of the invention to provide a hydraulic fuse that is simple of construction, less expensive to manufacture, and having a flow rate set point that is adjustable while the device is connected in the hydraulic circuit. It is another object that the device be provided with a damping mechanism that is unresponsive to flow rate surges that are of short duration. It is yet another object that the set point adjustment not affect the damping mechanism over most of the set point adjustment range. These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
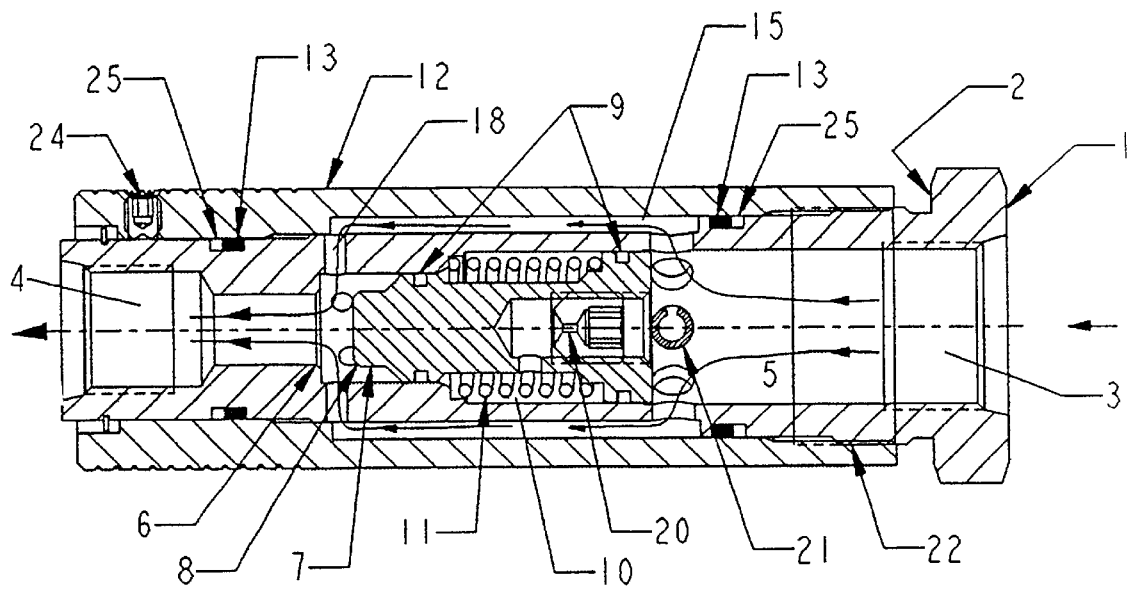
FIG. 1 is a longitudinal sectional view of the fuse in the open condition.
Figure 2:
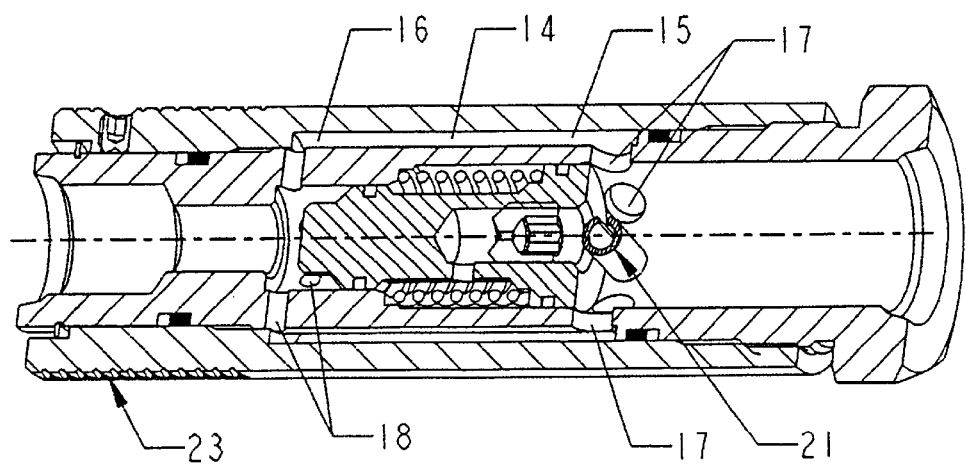
FIG. 2 is a perspective longitudinal sectional view of the fuse in open condition.
Figure 3:
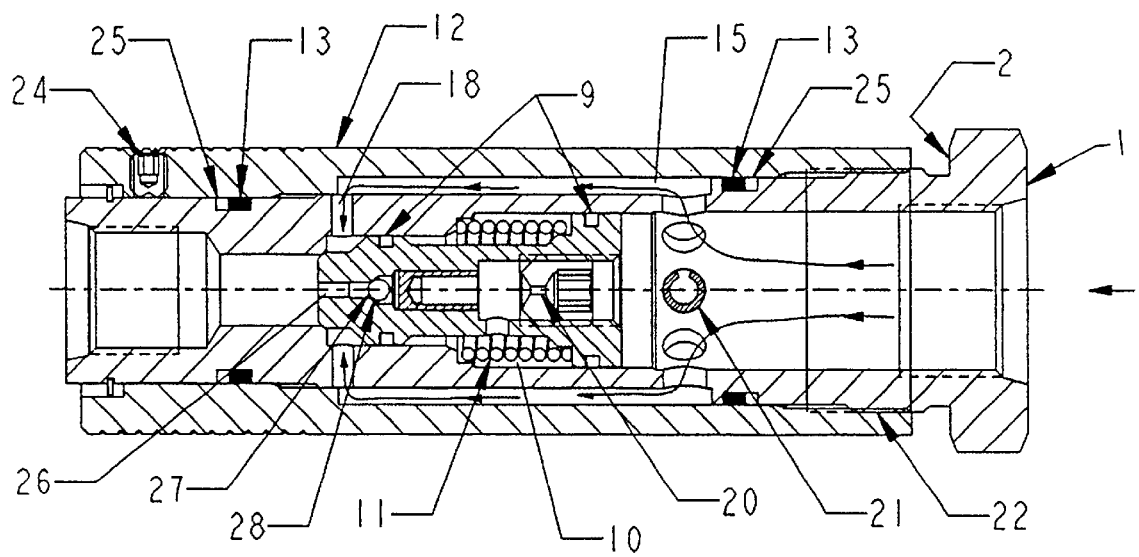
FIG. 3 is a longitudinal sectional view of the fuse in the closed condition.
Figure 4:
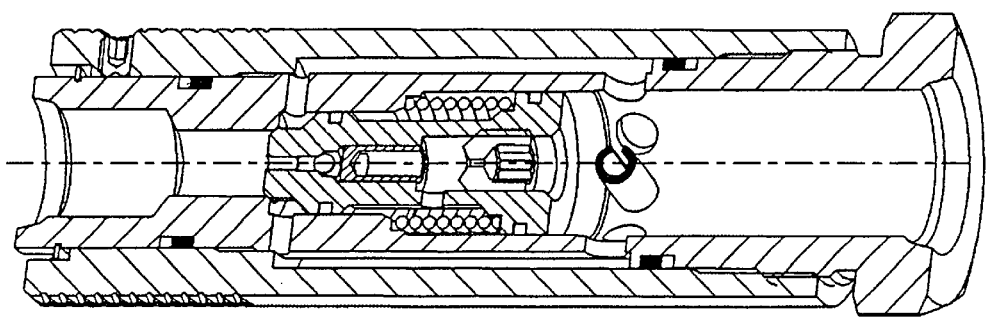
FIG. 4 is a perspective longitudinal sectional view of the fuse in closed condition.

Referring now to the drawing FIGS. 1–4, the hydraulic fuse valve 1 of the invention has a housing 2 machined from a hexagonal bar with an axial bore 5 between a fluid inlet 3 and outlet 4 that are provided with threaded connectors for sealing into a hydraulic circuit. An annular valve seat 6 is formed adjacent the outlet end. A poppet or piston 7 has a valve member 8 at a terminus arranged to seat in the valve seat 6 for closing off flow to the outlet when forced to the left. Sliding seals 9 between the piston 7 and the bore 5 define a first annular chamber 10. A compression spring 11 within chamber 10 urges the piston toward the inlet to a stop pin 21. An annular sleeve 12 encircles the housing, and threads 22 between the sleeve and the housing provide for axial adjustment therebetween. One end of the sleeve is knurled at 23 and a set screw 24 can lock the setting. Sliding seals13 with back up rings 25 define a second annular chamber 14 between the outer wall of the housing and the inner wall of the sleeve. Radial openings 17 in the wall of the housing provide fluid communication between the inlet 3 and the fore end 15 of chamber 14. At the aft end 15 of chamber 14 radial apertures 18 in the housing provide fluid communication between chamber 14 and the outlet 4. As the sleeve is rotated to move it to the right, the apertures 18 become smaller. Fluid passing from inlet to outlet experiences a pressure drop at the apertures. As the flow rate increases, the pressure drop increases until the difference in pressure between inlet and outlet is great enough to overcome the bias of spring 11, and the piston 7 moves to the left, shutting off flow. The device resets itself when inlet pressure is removed. By moving the sleeve to the right, the apertures are reduced in size, and the pressure drop increases for a given flow rate. The flow rate that will trigger shut off is adjusted by simply adjusting the sleeve relative to the housing. This may be done while the device is connected in the circuit. As shown in FIG. 3, the piston may be provided optionally with a check valve mechanism to facilitate bleeding air from the system. The check valve mechanism comprises a passage 26 with tapered seat 28, and a ball 27 staked in the passage to seal against the seat.

THE DAMPING FUNCTION

As the piston moves to the left to close off the flow when a preset flow rate is exceeded, the volume of first annular chamber 10 is reduced. Fluid trapped in this chamber must escape through replaceable orifice assembly 20 to the inlet. The size of the orifice will determine how long it takes for the piston to close. This delay will prevent the valve from responding to pressure surges of short duration. The time delay or damping function is substantially independent of the flow rate setting. In the prior art, it is common to adjust the flow rate setting higher than is desirable to avoid the brief pressure surges that are common in normal operation of some hydraulic systems. That is unnecessary with this invention.

While we have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A hydraulic fuse valve for a hydraulic line comprising:
   a) a housing having an inlet at a first end, and a outlet at a second end, for sealing into a hydraulic circuit;
   b) an elongate axial bore in the housing in hydraulic fluid communication with the inlet and outlet;
   c) an annular valve seat within the bore adjacent the second end;
   d) a piston with a valve member at a terminus thereof constructed for cooperating with the valve seat to seal off fluid flow at the second end, the piston disposed within the bore for an axially sliding sealing coaxial fit, the piston closing off direct axial flow through the bore;
   e) a first annular chamber formed between the outer surface of the piston and the inner wall of a portion of the bore, the volume of the first chamber being reduced as the piston moves toward the outlet;
   f) spring bias means within the first annular chamber urging the piston away from the second end;
   g) an annular sleeve encircling the housing and provided with an axial sliding fit;
   h) a second annular chamber formed between the outer wall of the housing and a portion of the inner wall of the sleeve;
   i) sealing means disposed at both ends of the second chamber;
   j) opening means for fluid communication between a forward end of the second chamber and the inlet;
   k) aperture for flow restriction means for fluid communication between an aft end of the second chamber and the outlet;
   l) means for axial adjustment of the sleeve relative to the housing to change the size of the aperture for flow restriction means, to thereby alter the flow rate at which the pressure drop across the aperture means is great enough to overcome the spring bias means and cause the piston to move toward the outlet and close off the flow, the means for axial adjustment being operable while the fuse valve is connected in the hydraulic circuit; and
   m) orifice for flow restriction means in fluid communication between the first chamber and the inlet to control the rate of change of the volume of the first chamber to thereby delay the closing to prevent closing from high flow rates of short duration.

2. The hydraulic fuse valve according to claim 1 in which altering the flow rate at which the flow is cut off does not alter the prevention of closing from high flow rates of short duration.

3. The hydraulic fuse valve according to claim 1 in which the means for axial adjustment of the sleeve is a screw thread.

4. The hydraulic fuse valve according to claim 1 in which the orifice for flow restriction means is replaceable.

5. The hydraulic fuse valve according to claim 1 further comprising a check valve in the piston to facilitate bleeding air from the valve.

* * * * *